United States Patent
Choe

(10) Patent No.: US 8,379,595 B2
(45) Date of Patent: Feb. 19, 2013

(54) METHOD AND APPARATUS FOR SECURING QUALITY OF SERVICE OF DATA COMMUNICATION

(75) Inventor: Yun-ju Choe, Uiwang-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1761 days.

(21) Appl. No.: 11/600,052

(22) Filed: Nov. 16, 2006

(65) Prior Publication Data

US 2007/0263575 A1  Nov. 15, 2007

(30) Foreign Application Priority Data

May 11, 2006  (KR) .......................... 10-2006-0042391

(51) Int. Cl.
*H04W 4/00* (2009.01)
*H04W 36/00* (2009.01)

(52) U.S. Cl. ...................... 370/331; 370/338; 455/432.1; 455/432.2; 455/436; 455/437; 455/439; 455/442; 455/443; 455/444

(58) Field of Classification Search .................. 370/331, 370/395.21
See application file for complete search history.

(56) References Cited

U.S. PATENT DOCUMENTS

| | | | |
|---|---|---|---|
| 6,134,200 A | 10/2000 | Timmermans | |
| 6,889,050 B1 * | 5/2005 | Willars et al. ............... | 455/452.2 |
| 6,968,190 B1 | 11/2005 | Suumäki et al. | |
| 7,346,007 B2 | 3/2008 | Curcio et al. | |
| 2005/0037757 A1 * | 2/2005 | Moon et al. .................... | 455/436 |
| 2006/0014539 A1 | 1/2006 | Oh | |
| 2006/0092879 A1 | 5/2006 | Jeong et al. | |
| 2006/0128385 A1 * | 6/2006 | Lee et al. ....................... | 455/436 |
| 2007/0171867 A1 * | 7/2007 | Kim .............................. | 370/331 |

FOREIGN PATENT DOCUMENTS

| | | |
|---|---|---|
| CN | 1582053 A | 2/2005 |
| JP | 2004-153321 | 5/2004 |
| JP | 2006-500808 | 1/2006 |
| JP | 2006-33838 | 2/2006 |
| KR | 10-2006-0027761 | 3/2006 |
| KR | 10-2006-0032544 | 4/2006 |
| KR | 10-0601886 | 7/2006 |
| RU | 2073913 C1 | 2/1997 |
| WO | WO99/01005 | 1/1999 |

(Continued)

OTHER PUBLICATIONS

Search Report issued in PCT International Application No. PCT/KR2007/001852 on Jul. 19, 2007.

(Continued)

*Primary Examiner* — Huy C Ho
(74) *Attorney, Agent, or Firm* — Staas & Halsey LLP

(57) ABSTRACT

A method and apparatus for securing a quality of service (QoS) of data communication is provided. The method of securing the QoS of data being received by a mobile terminal at a reception side that performs a handover from a first network to a second network comprises generating a packet including information about the second network, transmitting the packet to a transmission side, and selectively performing the handover according to whether a packet including information in response to the packet is received. When a reception side performs a handover, a transmission side can be informed of information about the second network via the exchange of packets between the reception side and the transmission side, thereby securing a QoS of the data transmission.

24 Claims, 11 Drawing Sheets

FOREIGN PATENT DOCUMENTS

| WO | 02/15630 A1 | 2/2002 |
|---|---|---|
| WO | WO 2004/102848 | 11/2004 |
| WO | 2004/112417 A1 | 12/2004 |
| WO | 2005/027556 A1 | 3/2005 |
| WO | 2005/053346 A1 | 6/2005 |
| WO | WO2005/084146 A2 | 9/2005 |
| WO | 10-2006-0040183 | 5/2006 |

OTHER PUBLICATIONS

Russian Office Action for corresponding Russian Patent Application No. 2008144420 dated May 12, 2010, 4 pgs.

Chinese Office Action for corresponding Chinese Patent Application No. 200780008239.0 dated Oct. 8, 2010.

Russian Office Action issued Jun. 22, 2011 in corresponding Russian Patent Application 2008144420/09(057927).

Japanese Office Action mailed Jan. 24, 2012 issued in corresponding Japanese Patent Application No. 2009-509403.

Korean Notice of Allowance mailed May 31, 2007 issued in corresponding Korean Patent Application No. 10-2006-0042391.

* cited by examiner

METHOD AND APPARATUS FOR SECURING QUALITY OF SERVICE OF DATA COMMUNICATION

CROSS-REFERENCE TO RELATED APPLICATIONS

This application claims the benefits accruing under 35 U.S.C. §119 from Korean Patent Application No. 2006-42391, filed on May 11, 2006 in the Korean Intellectual Property Office, the disclosure of which is incorporated herein by reference.

BACKGROUND OF THE INVENTION

1. Field of the Invention

The present invention relates to a quality of service (QoS) of data communication, and more particularly, to a method and apparatus for securing a quality of service (QoS) of data communication by controlling a handover of a multi-mode-multi-band terminal, which can be used in a variety of wireless communication networks, between heterogeneous/homogeneous communication networks using an exchange of packets between a data reception side and a data transmission side.

2. Related Art

Existing wireless communication networks, such as code division multiple access (CDMA), wideband CDMA (WCDMA), Wibro (which is based on the same IEEE 802.16 standard as WiMax, but is designed to maintain connectivity on the go, tracking a mobile terminal at speeds of up to 37 miles per hour), high-speed downlink packet access (HSDPA), etc., typically include a distribution system which serves as a backbone wired communication network, such as Ethernet that supports servers and one or more access routers (ARs) or communication switch systems to link with other networks, including, for example, the Internet, and one or more control modules, known as wireless access points (APs) or base stations arranged at designated locations in the wireless communication networks, each supporting wireless communication with a number of mobile terminals, which can be mobile devices such as laptops, PDAs, cellular phones, or other wireless communication devices, within its designated service area (transmission range) and providing access to the distribution system. The wireless access point (AP) or base station is provided to access network resources, via the distribution system, while the mobile terminals are provided to communicate with the wireless access point (AP) or base station, via wireless links, as specified by standard communication protocols.

As the number of mobile communication users has increased rapidly, and mobile communication services supporting multimedia have become more sophisticated in a variety of types and standards, these mobile communication services are required to provide mobile communication users with a seamless service. As a result, it is important to perform a handover between heterogeneous/homogeneous communication networks.

FIG. 1A is a diagram of a conventional handover between example homogenous wireless communication networks. Referring to FIG. 1A, the distribution system is a wired communication network 110. If the wireless communication networks are wireless local area networks (LANs), standard communication protocols for a wireless LAN, such as IEEE 802.11 standards are utilized. An access router 120 and one or more access points (APs), for example, a first access point (AP1) 130 and a second access point (AP2) 140 are also utilized to perform a handover when a mobile terminal is moving between service areas covered by the first access point (AP1) 130 and the second access point (AP2). In such a wireless LAN provided by the IEEE 802.11 standard, an access router (AR) 120 at a transmission side accesses the wired communication network 110, and transmits data to a mobile terminal, via an access point (AP) 130 or 140. In this regard, it is assumed that the mobile terminal moves from a service area provided by a first access point (AP1) 130 to a service area provided by a second access point (AP2) 140. The mobile terminal compares a signal strength of the first access point (AP1) 130 with a signal strength of the second access point (AP2) 140. If the signal strength of the second access point (AP2) 140 is higher than the signal strength of the first access point (AP1) 130, the mobile terminal transmits a signal requesting a handover from the first access point (AP1) 130 to the second access point (AP2) 140, via the access router (AR) 120. The access router (AR) 120 then sends a signal to perform the handover from the first access point (AP1) 130 to the second access point (AP2) 140 to the mobile terminal so that the mobile terminal transmits data through the second access point (AP2) 140.

If the wireless communication networks are homogeneous CDMA and WCDMA networks, the handover between example homogeneous CDMA and WCDMA networks is performed the same way as in the wireless LAN networks. However, the access router 120 may be replaced by a mobile communication switch station 120, and the access points (APs) 130 and 140 may be replaced by base stations 130 and 140.

FIG. 1B is a diagram of a conventional handover between example heterogeneous wireless communication networks. Referring to FIG. 1B, the distribution system can include both a CDMA switch system 150 and a WCDMA switch system 170. The handover is performed between a CDMA network and a WCDMA network. A mobile terminal may be a multi-mode, multi-band mobile phone which can operate in both the CDMA and WCDMA networks and can communicate, when moving from a CDMA base station 160 to a WCDMA base station 180. The mobile terminal also compares a signal strength of the CDMA base station 160 with a signal strength of the WCDMA base station 180. If the signal strength of the WCDMA base station 180 is higher than the signal strength of the CDMA base station 160, the mobile terminal transmits a signal requesting the handover to a CDMA switch system 150. The CDMA switch system 150 transmits a signal for preparing the handover to a WCDMA switch system 170. When the handover is completely prepared, the WCDMA exchange system 160 informs the CDMA exchange system 150 of the fact so that the multi-mode multi-band terminal may transmit the data through the WCDMA base station 180.

As shown in FIGS. 1A and 1B, a handover is performed, via communication between a mobile terminal at a reception side and an access router (AR) or a switch system at a transmission side. In particular, since the handover is performed regardless of a transmission side, the transmission side that transmits data is not informed of a particular wireless communication network in which the mobile terminal at the reception side performs the handover. Therefore, a problem occurs if the transmission side transmits data to a particular wireless communication network to which the mobile terminal at the reception side belongs before the handover is performed.

For example, the mobile terminal at the reception side performs a handover from a wireless LAN, as shown, for example, in FIG. 1A, having a maximum data transmission rate of 2 Mbps to a WCDMA network, as shown, for example, in FIG. 1B having a maximum data transmission rate of 384 Kbps. Therefore, if the transmission side used to transmit data at a data transmission rate of 1 Mbps in the wireless LAN, as shown in FIG. 1A, having the maximum data transmission rate of 2 Mbps, is not informed of another wireless network, for example, a WCDMA network, to which the mobile terminal at the reception side moves to, and still transmits data at the data transmission rate of 1 Mbps after the handover is performed, the mobile terminal at the reception side cannot receive the entire data transmitted by the transmission side. If the transmission side transmits music or video image data for real-time streaming, the reception side cannot seamlessly listen to music or view the motion video image in real-time.

Accordingly, there is a need for a new and efficient mechanism to ensure quality of services (QoS) as a mobile terminal moves from one wireless communication network to another wireless communication network.

SUMMARY OF THE INVENTION

Several aspects and example embodiments of the present invention provide a method and apparatus for securing quality of service (QoS) in order to perform a handover after a mobile terminal at a reception side transmits information about a network, in which the handover is performed, to a transmission side.

Additional aspects and/or advantages of the invention will be set forth in part in the description which follows and, in part, will be obvious from the description, or may be learned by practice of the invention.

In accordance with an example embodiment of the present invention, there is provided a method of securing a quality of service (QoS) of data being received by a mobile terminal at a reception side that performs a handover from a first network to a second network. Such a method comprises: generating a packet including information about the second network; transmitting the packet to a transmission side; and selectively performing the handover according to whether a packet including information in response to the packet is received.

According to an aspect of the present invention, the information about the second network may be information about a data transmission rate of the second network. The packet including the information about the second network may be a real-time transport control protocol (RTCP) packet.

In accordance with another example embodiment of the present invention, there is provided an apparatus for securing a QoS of data being received by a mobile terminal at a reception side that performs a handover from a first network to a second network. Such an apparatus comprises: a network information generator arranged to generate a packet including information about the second network; a network information transmitter arranged to transmit the packet to a transmission side; and a handover performing unit arranged to selectively perform the handover according to whether a packet including information in response to the packet is received.

According to an aspect of the present invention, the information about the second network may be information about a data transmission rate of the second network. The packet including the information about the second network may be an RTCP packet.

In accordance with yet another example embodiment of the present invention, there is provided a method of securing a QoS of data performed by a device that is transmitting data to a mobile terminal that performs a handover from a first network to a second network. Such a method comprises: receiving a packet including information about the second network from the mobile terminal; and converting data to be transmitted to the mobile terminal according to the information about the second network included in the packet.

According to an aspect of the present invention, the converting of the data may comprise converting the rate of compression or the size of the data to be transmitted to the mobile terminal.

According to an aspect of the present invention, the method may further comprise: generating a packet including response information informing that the data transmission is prepared based on the information about the second network; and transmitting the packet to a reception side.

According to an aspect of the present invention, the packet may be a real-time transport protocol (RTP) packet.

According to an aspect of the present invention, the generating of the packet may comprise: setting a marker bit of the RTP packet to "1". The RTP packets in which the marker bit is set to 1 may be plural. The response information may be information about a data transmission rate of the second network. The packet may be a RTCP packet.

In accordance with another example embodiment of the present invention, there is provided an apparatus for securing a QoS of data using a device that is transmitting data to a mobile terminal that performs a handover from a first network to a second network. Such a method comprises: a network information reception unit arranged to receive a packet including information about the second network from the mobile terminal; and a data converter arranged to convert data to be transmitted to the mobile terminal according to the information about the second network included in the packet.

According to an aspect of the present invention, the apparatus may further comprise: a response information generator arranged to generate an RTP packet including response information informing that the data transmission is prepared based on the information about the second network; and a response information transmitter arranged to transmit the packet to mobile terminal.

According to an aspect of the present invention, the response information generator may set a marker bit of the RTP packet to "1" to generate the RTP packet.

According to an aspect of the present invention, the response information generator may generate the RTP packet including the response information.

According to another aspect of the present invention, there is provided a computer readable recording medium storing a computer readable program for executing a method of securing a quality of service (QoS).

In addition to the example embodiments and aspects as described above, further aspects and embodiments will be apparent by reference to the drawings and by study of the following descriptions.

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims. The following represents brief descriptions of the drawings, wherein:

DETAILED DESCRIPTION OF EXAMPLE EMBODIMENTS

Figure 1A:
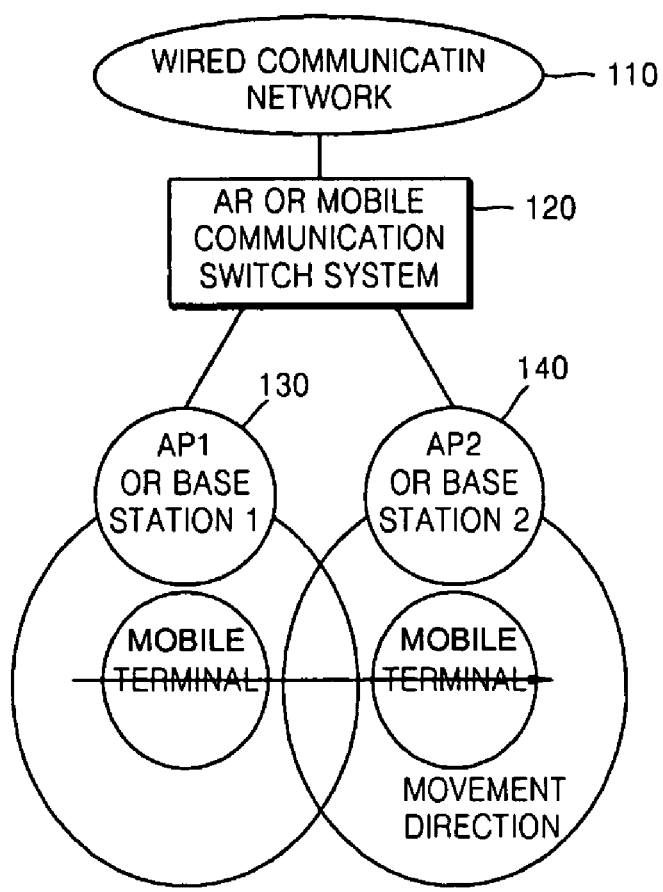
FIG. 1A is a diagram of a typical handover between homogenous wireless communication networks.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2A:
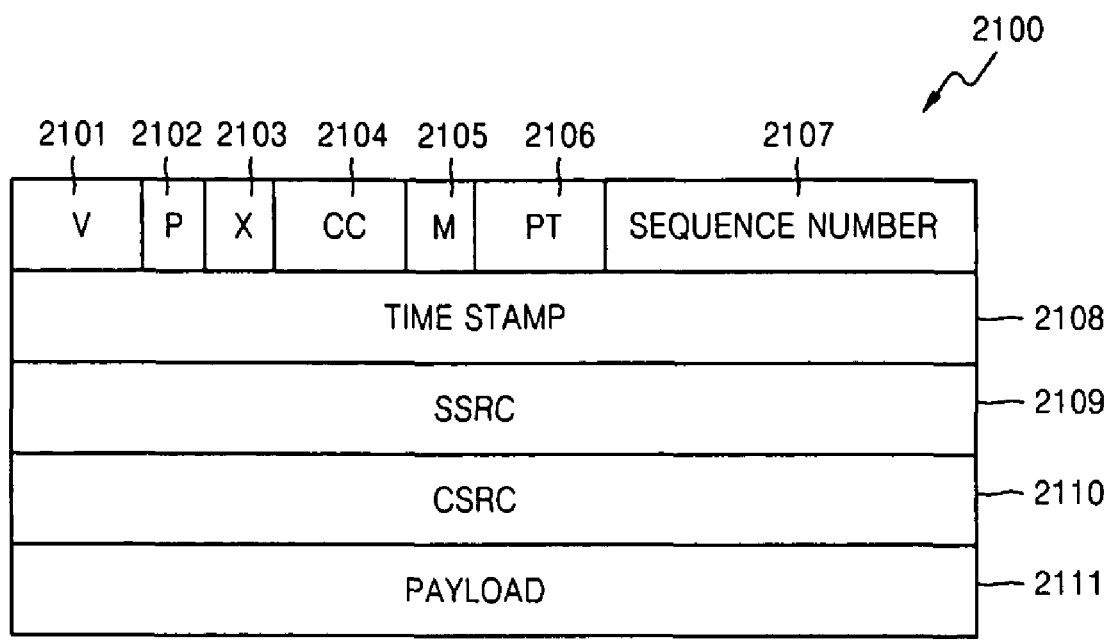
FIG. 2A is a diagram of a real-time transport protocol (RTP) packet used in a method of securing a quality of service (QoS), according to an example embodiment of the present invention.
Figure 2B:
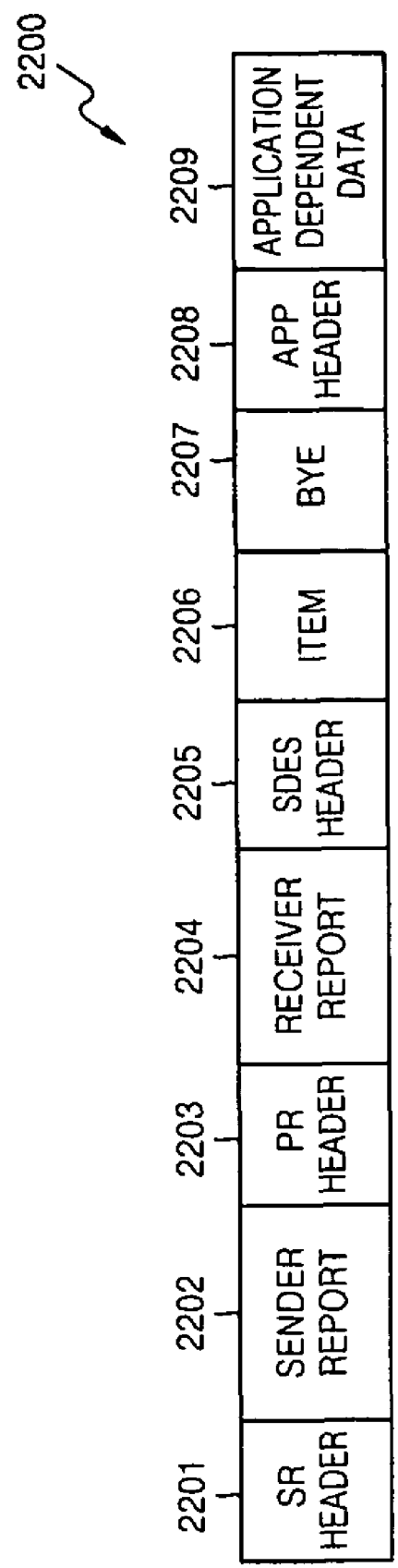
FIGS. 2B through 2C are diagrams of a real-time transport control protocol (RTCP) packet used in a method of securing a quality of service (QoS), according to an example embodiment of the present invention.
Figure 2C:
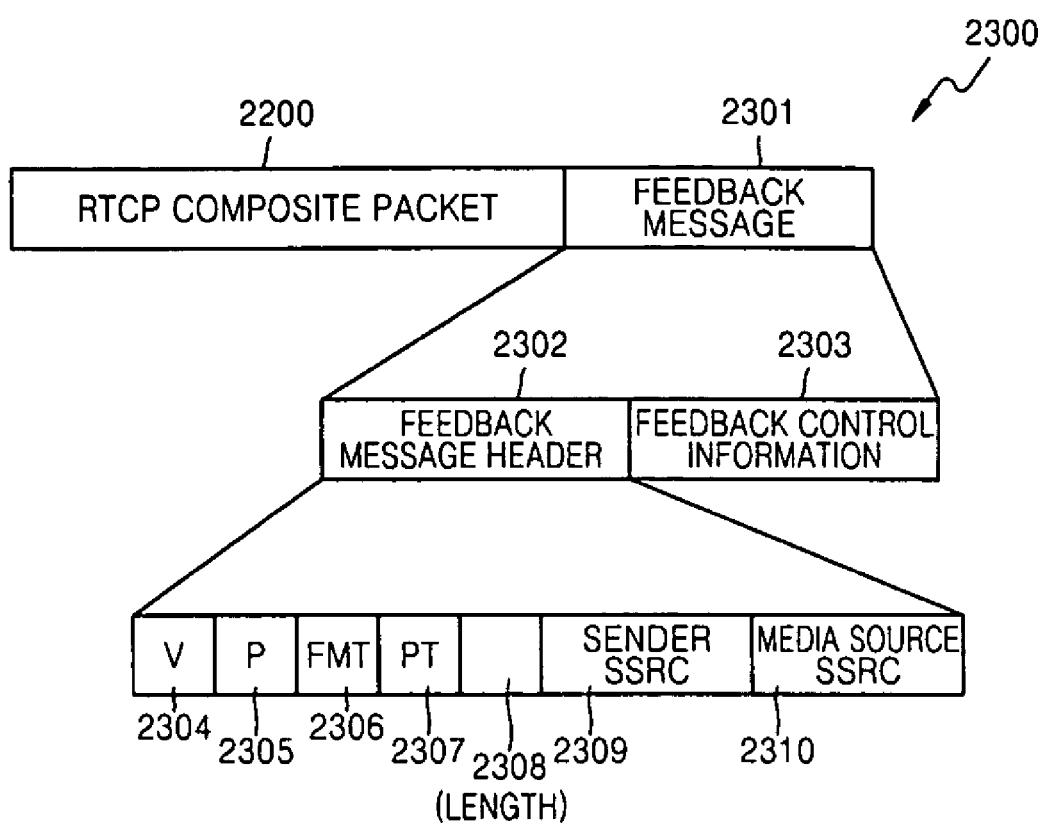

FIG. 2A is a diagram of a real-time transport protocol (RTP) packet used in a method of securing a quality of service (QoS), according to an example embodiment of the present invention. FIGS. 2B through 2C are diagrams of a real-time transport control protocol (RTCP) packet 2200 used in a method of securing a quality of service (QoS), according to an example embodiment of the present invention.

Referring to FIG. 2A, a RTP is a protocol designed to transmit real-time data, such as audio, video, and simulation data. Such a RTP packet 2100 comprises a segment of data and a small header prepended to the data. For example, the RTP packet 210 comprises a version (V) field 2101 specifying which version of protocol is represented in the RTP packet, a padding (P) field 2102 indicating whether a padding byte exists or not, an extension (X) field 2103 indicating whether an extension field exists or not, a CC field 2104 indicating the number of CSRC fields, a marker bit (M) field 2105, a PT field 2104 indicating timing of a payload 2111 of the RTP packet 2100, a sequence number (SN) field 2107 indicating whether each of transmitted RTP packets is lost or determining a sequence of transmitted RTP packets, a time stamp (TS) field 2108 indicating timing of when the RTP packet 2100 performs sampling of a first byte, an SSRC field 2109 classifying data sources of an RTP session, and an CSRC field 2110 classifying providers of data of various source providers.

The marker (M) bit 2105 is used to indicate important events such as a frame boundary in a packet stream, which can be newly defined so as to be used for another purpose or deleted by extending the PT field 2106.

In contrast to the RTP packet, the RTCP packet is used to supplement the RTP and regularly transmit session information. In particular, the RTCP includes information about a packet damage rate, a rounded trip delay time, jitter, etc., in a streaming service so that a reception side and a transmission side can take an appropriate step to communicate based on the information. The RTCP packet can be classified as a sender report (SR) type in which the transmission side transmits information about the quality of a RTP session, a receiver report (RR) type in which the reception side transmits information about the quality of an RTP session, a source description (SDES) type including information about an ID of the reception side and the transmission side that belong to the RTP session, a BYE type used to inform its leave from the RTP session, and an APP type experimentally used in a new application or function.

Referring to FIG. 2B, the RTCP packet 2200, which is a combination of the types described above, is regularly transmitted. Specifically, the RTCP packet 2200 comprises an SR header 2201 indicating the SR type, an SR 2202 of the transmission side including the content of the SR header 2201, an RR header 2203 indicating the RR type, an RR 2204 of the reception side including the content of the RR header 2203, an SDES header 2205 indicating the SDES type, an ITEM 2206 including the content of the SDES header 2205, a BYE packet 2207, an APP header 2208 indicating the APP type, and an application dependent data field 2209 including the content of the APP header 2208.

The RTCP packet 2200 is regularly transmitted from the reception side or the transmission side. However, when an important event, such as a change in a data format, a change in a payload, a start or stop of data transmission, etc., occurs in a session between the reception side and the transmission side, the RTCP packet 2200 must be immediately transmitted in order to inform the event. To this end, an extension format of the RTCP packet 2200, which is referred to as an immediate feedback mode RTCP packet 2300, is used.

Referring to FIG. 2C, the immediate feedback mode RTCP packet 2300 comprises the regularly transmitted RTCP packet 2200 and a feedback message 2302. A feedback message header 2302 comprising a V field 2304 indicating a version of a protocol, a P field 2305 indicating whether a padding byte exists, an FMT field 2306 indicating the type of the feedback message 2301, a PT field 2307 indicating the type of the RTCP packet 2200, a length 2308 indicating the length of the feedback message 2301, a SSRC field 2309 of the transmission side selecting a transmitter of the RTCP packet 2200, and a media source SSRC field 2310 determining which kind of media source is related to the feedback message 2301 is located in the front of the feedback message 2301. A feedback control information field 2303 including feedback messages of a transport layer, an application layer, a payload, etc. is located in the back of the of the feedback message 2301.

Figure 1B:
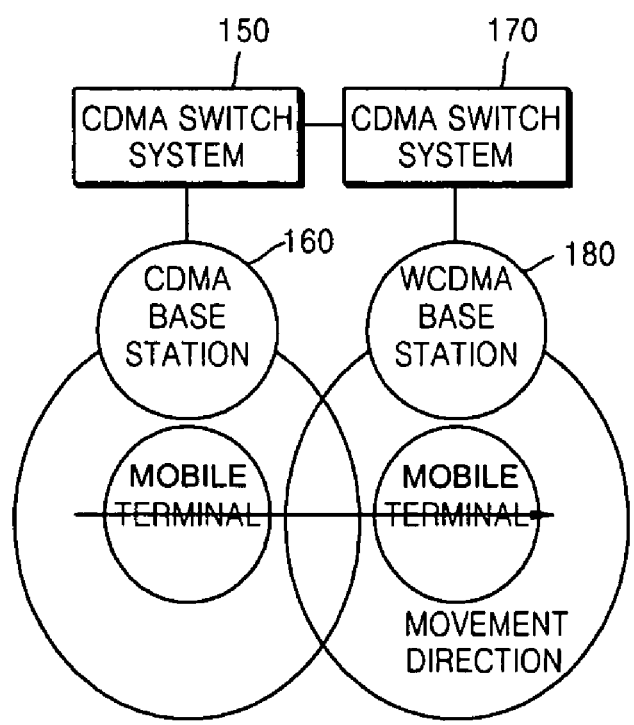
FIG. 1B is a diagram of a typical handover between heterogeneous wireless communication networks.
Figure 3:
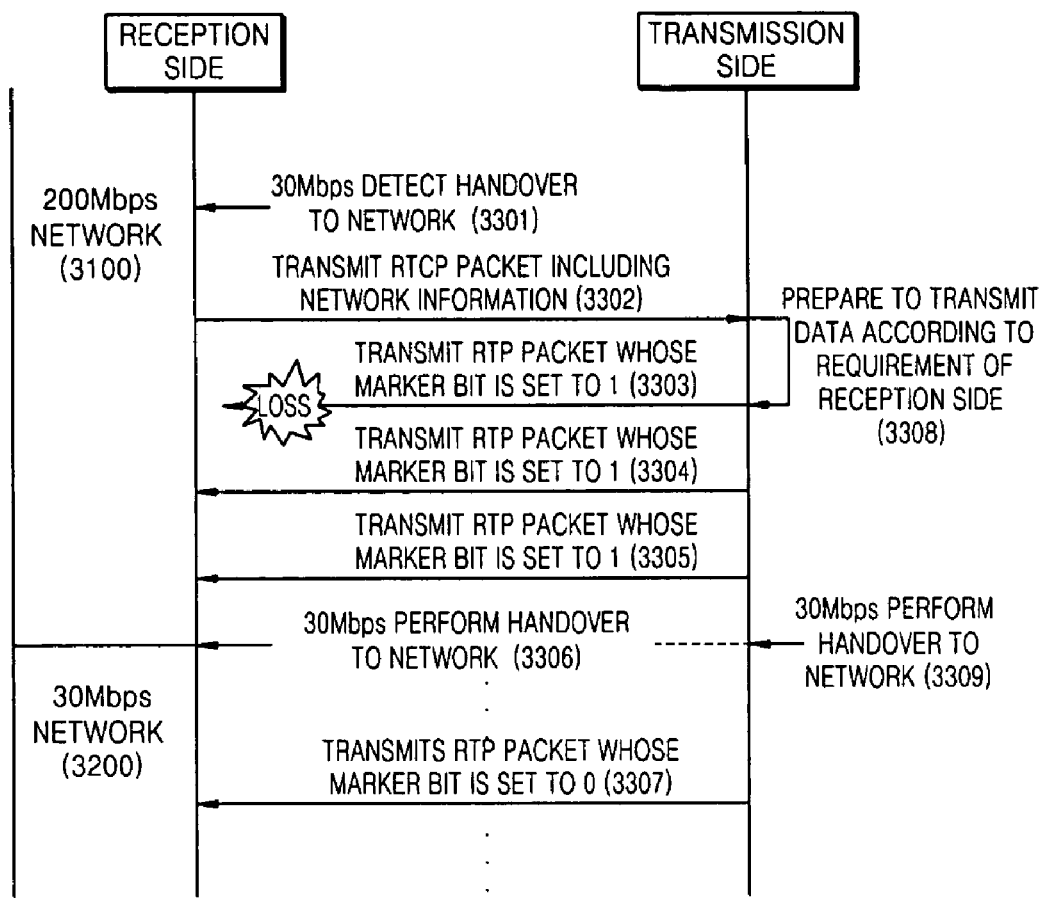
FIG. 3 is a diagram of an RTP/RTCP packet communication session between a reception side and a transmission side according to an example embodiment of the present invention.

A period of communication between a transmission side and a reception side is referred to as a "session". FIG. 3 is a diagram of an example RTP/RTCP packet transmission session between a reception side and a transmission side according to an embodiment of the present invention. According to an example embodiment of the present invention, it is assumed that a mobile terminal at a reception side is moving from a first (source) network 3100 having, for example, a data transmission rate of 200 Mbps, to a second (destination) network 3200 having, for example, a data transmission rate of 30 Mbps. An access router (AR) or a switch system, as shown, for example, at FIGS. 1A-1B, is located at a transmission side. However, for the sake of convenience, communication is only described between a reception side and a transmission side, rather than between a mobile terminal and an access router (AR) or a switch system in wireless communication networks.

Referring to FIG. 3, the transmission side transmits data to the reception side in a first network 3100 having a data transmission rate of 200 Mbps. When the reception side (e.g., mobile terminal) is moving from the first network 3100 having a data transmission rate of 200 Mbps to the second network 3200 having a data transmission rate of 30 Mbps, the reception side detects that it is necessary to perform a handover from the first network 3100 to the second network 3200 (Operation 3301). Upon detection of a handover, the reception side transmits an RTCP packet including information about the second network 3200 to the transmission side (Operation 3302). The RTCP packet including the information about the second network 3200 can be the RTCP packet 2200, as shown, for example, in FIG. 2B, or the immediate feedback mode RTCP packet 2300, as shown, for example, in FIG. 2C.

The immediate feedback mode RTCP packet 2300 may be used to transmit information about the second network 3200 to the transmission side immediately, when the reception side detects the handover.

When the reception side moves between two networks having a different data transmission rate, a data transmission rate of a destination network to which the reception side moves to, is included in the information about the destination network.

Upon receipt of the RTCP packet including the information about the second network 3200, the transmission side prepares to transmit data satisfying the requirement of the reception side based on the information about the second network 3200 transmitted by the reception side (Operation 3308). For example, the transmission side compresses a video image or sound data or deteriorates video image quality or sound quality in order to transmit the data through the second network 3200 having a slower data transmission rate than the first network 3100. Also, the transmission side changes previously prepared video image data or sound data to data according to the data transmission rate of the second network 3200 in order to transmit the data.

When the transmission side is completely prepared to transmit the data, the transmission side transmits an RTP packet in which a marker bit is set to "1" to the reception side in order to send response information informing that the reception side is allowed to perform the handover (Operation 3303). If a packet loss occurs during the RTP packet transmission, since the reception side fails to receive the RTP packet and perform the handover, the transmission side generates a plurality of RTP packets in which the marker bit is set to "1" and transmits the RTP packets to the reception side (Operations 3303 through 3305).

Upon receipt of the RTP packet in which the market bit is set to "1" from the transmission side, the reception side performs the handover from the first network 3100 to the second network 3200 having the data transmission rate of 30 Mbps (Operation 3306). If the transmission side transmits a plurality of RTP packets in which the marker bit is set to "1" (Operations 3303 through 3305), the reception side can be set to perform the handover only when the reception side receives more RTP packets than a predetermined number of RTP packets. For example, the reception side is set to perform the handover when the reception side receives more than two RTP packets in which the marker bit is set to "1". The reception side transmits information about the second network 3200 to the transmission side, and the transmission side prepares to transmit data according to the information, thereby securing a QoS of data communication between the reception side and the transmission side, such as audio or video streaming during the handover.

Once the reception side completely performs the handover, the transmission side transmits data at the data transmission rate of 30 Mbps (Operation 3309), resets the marker bit of the RTP packet to "0", and transmits the RTP packet to the reception side (Operation 3307).

However, if the transmission side simultaneously transmits and receives data such as a voice over Internet protocol (VoIP), the transmission side generates a separate session and performs operations 3301 through 3309.

In the current example embodiment of the present invention, handover is performed when a data transmission rate changes, i.e., between heterogeneous communication networks. However, if a reception side moves from one network having less users to another network having more users, or from one network with less radio wave interruption to another network with more radio wave interruption, the handover can also be performed.

In this regard, since a data transmission rate can change, information about the number of users accessing a destination network to which the reception side moves to, signal to noise ratio (SNR) information indicating the interruption of a radio wave, bit error rate (BER), etc., can be included in information about the destination network.

Figure 4A:
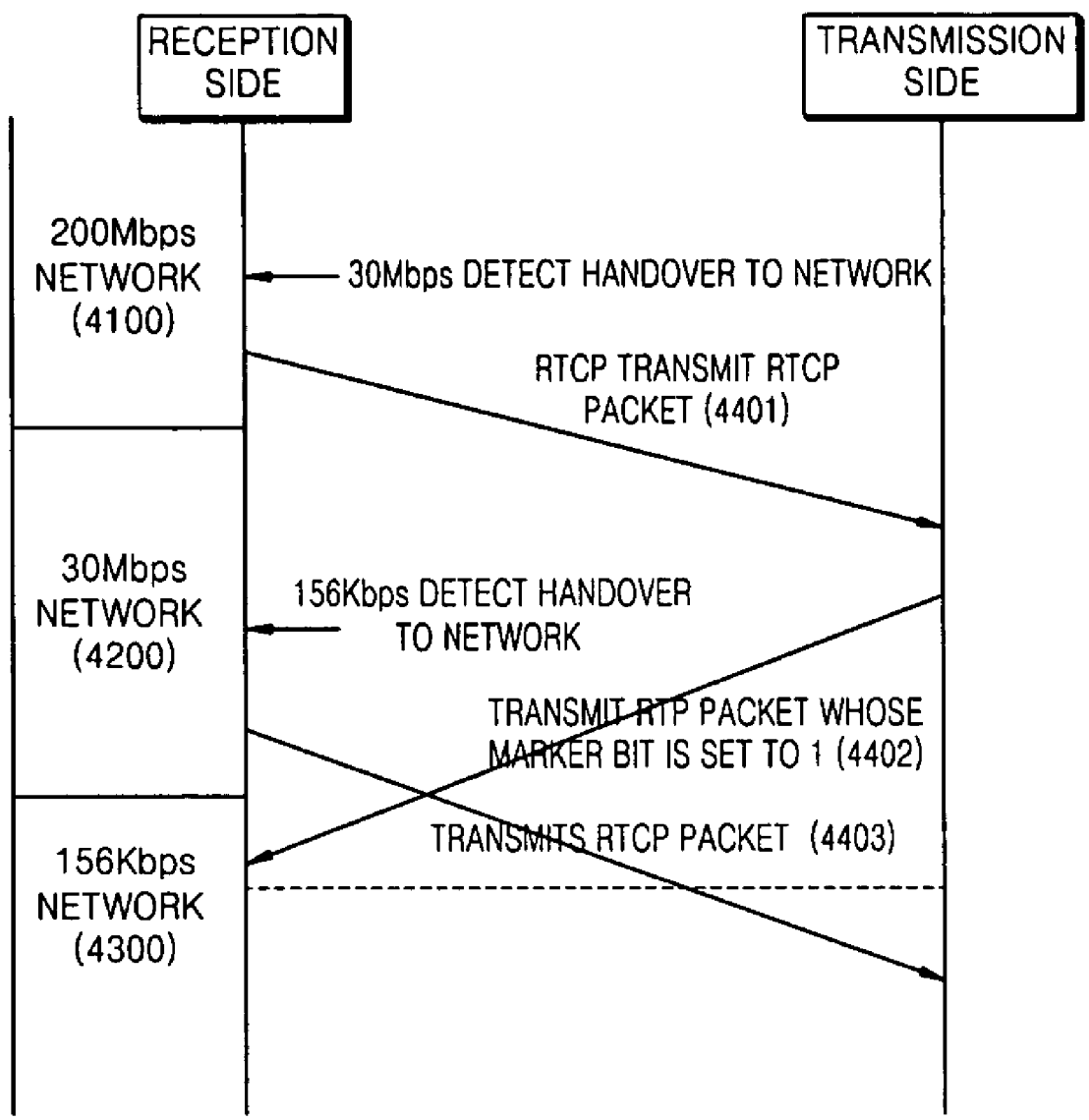
FIGS. 4A and 4B are diagrams of an RTP/RTCP packet communication session between a reception side and a transmission side according to another example embodiment of the present invention.

Although the reception side transmits the information about the second network 3200 to the transmission side through the above operations, a problem occurs when the reception side sequentially performs a handover to different networks as shown in FIG. 4A. Referring to FIG. 4A, it is assumed that the reception side sequentially moves from a first network 4100 having, for example, a data transmission rate of 200 Mbps, to a second network 4200 having, for example, a data transmission rate of 30 Mbps, and then to a third network 4300 having, for example, a data transmission rate of 156 Kbps.

When the reception side moves from the first network 4100 to the second network 4200, the reception side detects that it is necessary to perform a handover from the first network 4100 to the second network 4200. The reception side that detects the handover, transmits an RTCP packet including information about the second network 4200 to the transmission side (Operation 4401). The transmission side transmits an RTP packet, in which a marker bit is "1", to the transmission side (Operation 4402). If the reception side moves to the third network 4300 before the reception side receives the RTP packet, the reception side transmits an RTCP packet including information about the third network 4300 to the transmission side (Operation 4403) and receives the RTP packet in which the market bit is "1" (Operation 4402). Since the reception side regards the RTP packet as a response to the RTCP packet including the information about the third network 4300, the reception side performs a handover from the second network 4200 to the third network 4300. However, since the RTP packet is a response to the RTCP packet including the information about the second network 4200, the transmission side and the reception side, which respectively have the information about the second and third networks 4200 and 4300, set a session.

Figure 4B:
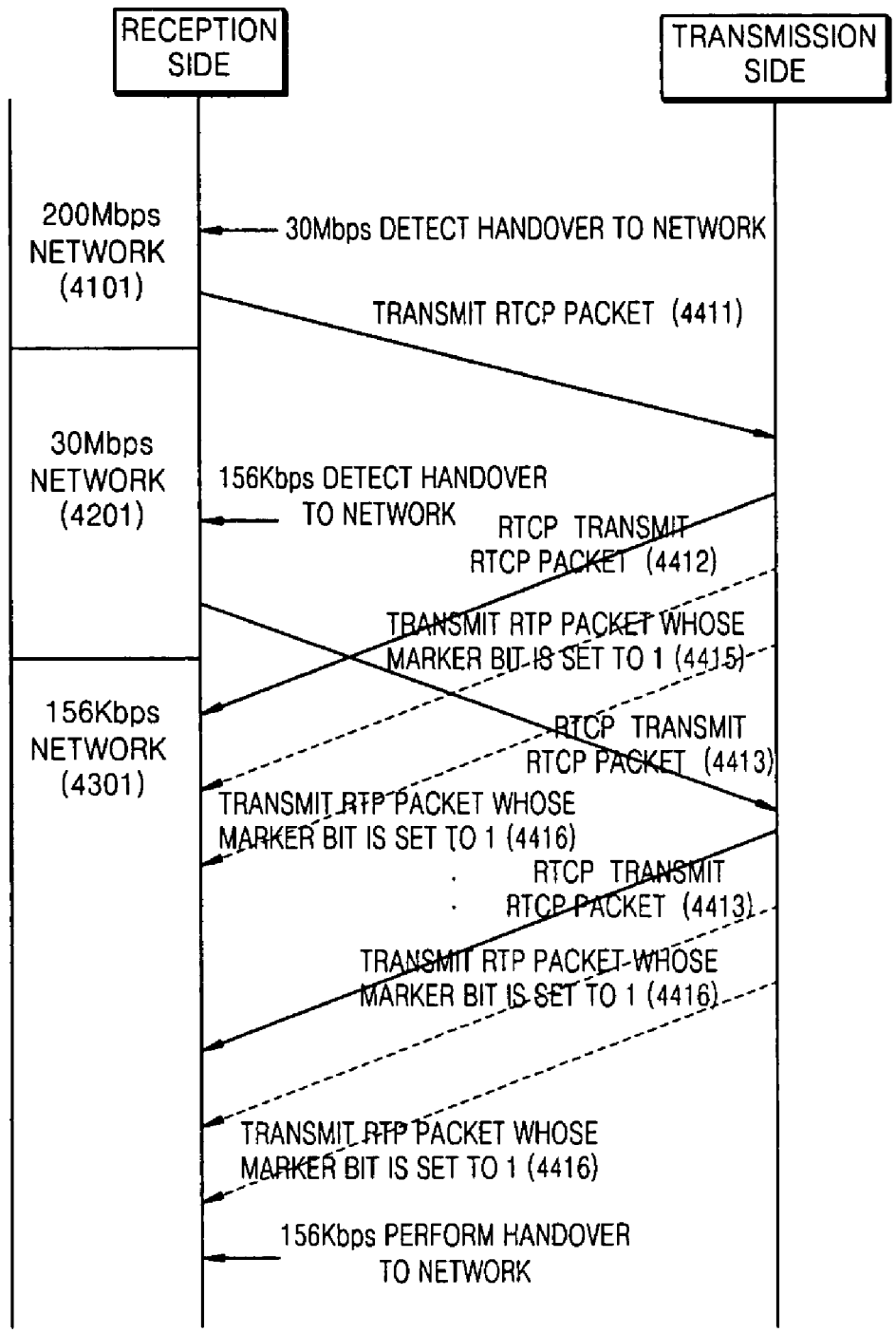

To overcome this defect, referring to FIG. 4B, the transmission side prepares to transmit data according to a second network 4201 having a data transmission rate of 30 Mbps in response to the reception side that transmits an RTCP packet including information about the second network 4201 (Operation 4411), and transmits an RTCP packet including response information for informing that the reception side is allowed to perform a handover to the reception side (Operation 4412). The RTCP packet can be the regularly transmitted RTCP packet 2200, as shown in FIG. 2B, or the immediate feedback mode RTCP packet 2300, as shown in FIG. 2C.

The immediate feedback mode RTCP packet 2300 is used to transmit the response information at the earliest time, thereby reducing a handover standby time of the reception side.

The reception side that receives the RTCP packet including the response information does not perform the handover since the response information included in the RTCP packet informs that the transmission side is prepared to transmit data not according to the third network 4301 but according to the second network 4201. The reception side performs the handover to the third network 4301 when the transmission side transmits an RTCP packet (Operation 4414) in response to the reception side that transmits an RTCP packet including information about the third network 4301.

Since a mobile terminal at the reception side fails to perform the handover due to a packet loss which occurred during the RTP packet and RTCP packet transmission, the transmission side can continuously transmit an RTP packet in which the marker bit is set to "1" in addition to the RTCP packet (Operations 4415 through 4418).

As shown in FIG. 3, if the transmission side simultaneously transmits and receives data such as voice over IP (VoIP), the transmission side generates a separate session and performs operations 4411 through 4418.

Figure 5A:
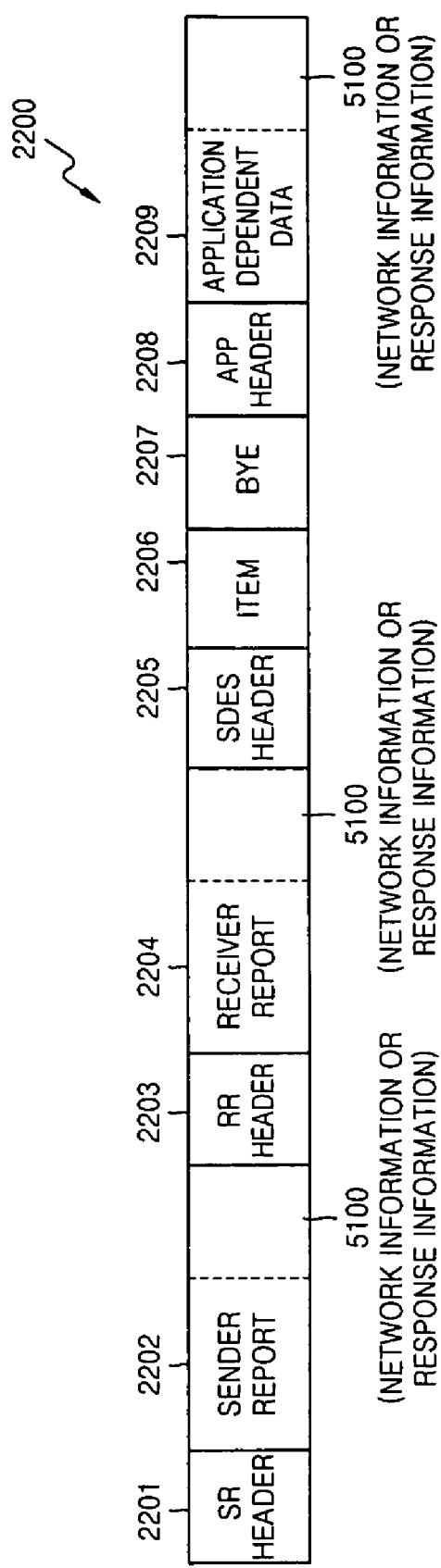
FIGS. 5A and 5B are diagrams of an RTCP packet according to an example embodiment of the present invention.
Figure 5B:
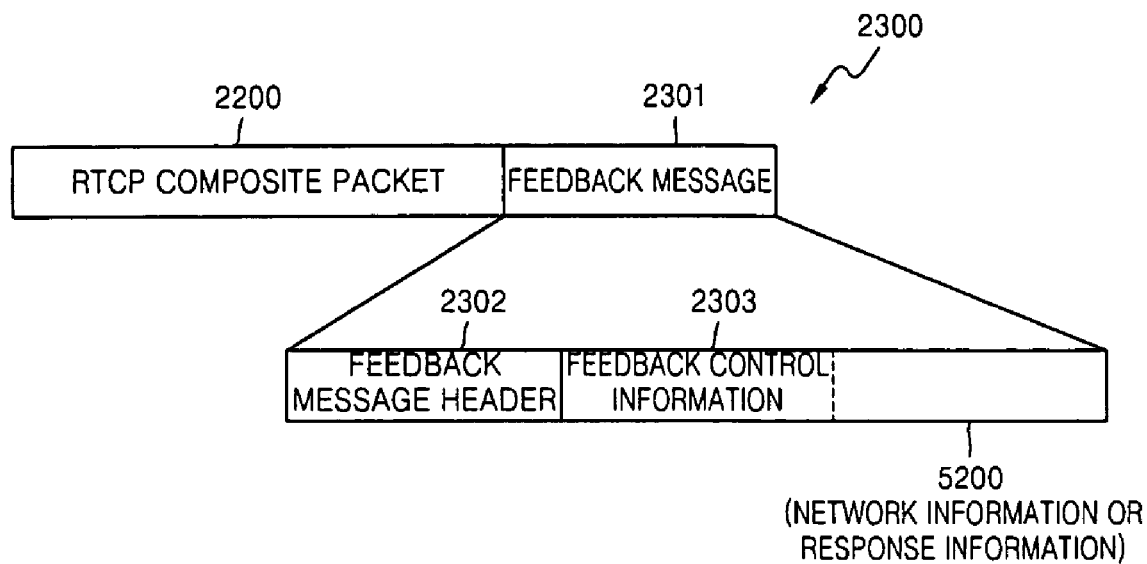

FIGS. 5A and 5B are diagrams of an RTCP packet 2200 according to an example embodiment of the present invention. Referring to FIG. 5A, network information 5100 of a particular network in which a handover is performed, which is included in an RTCP packet transmitted by a reception side, is included in the back of a sender report (SR) 2202, a receiver report (RR) 2204, or an application dependent data field 2209, or in a separate field (not shown) of the RTCP packet 2200.

Like the RTCP packet transmitted by the reception side, response information 5100, which is included in an RTCP packet transmitted by a transmission side, is included in the back of the SR 2202, the RR 2204, or the application dependent data field 2209, or in a separate field (not shown) of the RTCP packet 2200.

Referring to FIG. 5B, network information or response information 5200 can be included in the back of a feedback control information field 2303 of a feedback message 2301 of an immediate feedback mode RTCP packet 2300, as shown in FIG. 2C.

Although a QoS securing method that generates an RTP packet or an RTCP packet including network information and transmits the RTP packet or the RTCP packet is described, the present invention is not limited thereto. In particular, the present invention can be applied to all communication protocols that generate a packet including network information and transmit such a packet, via a transmission channel.

Figure 6:
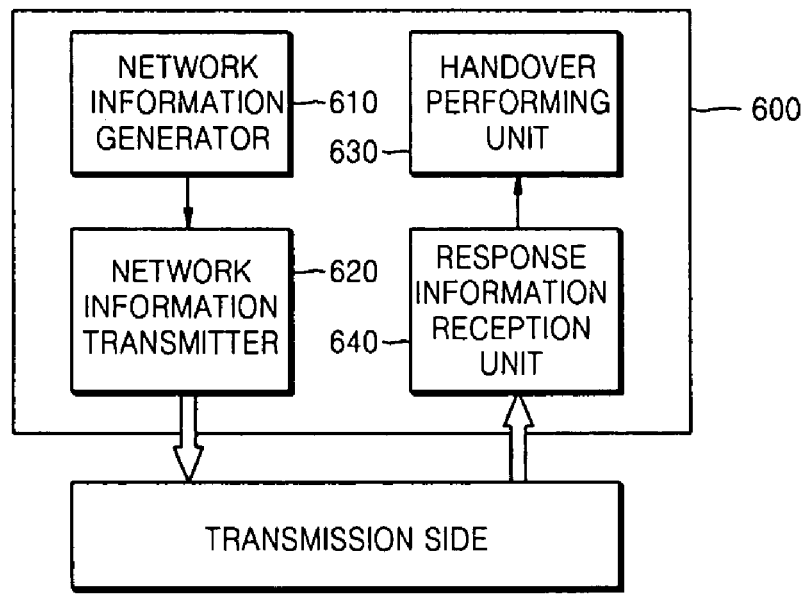
FIG. 6 is a block diagram of a QoS securing apparatus at a reception side according to an example embodiment of the present invention.

FIG. 6 is a block diagram of an example QoS securing apparatus at a reception side according to an example embodiment of the present invention. Referring to FIG. 6, the QoS securing apparatus 600 can be incorporated into or installed in a mobile terminal at the reception side. Such a QoS securing apparatus 600 comprises a network information generator 610, a network information transmitter 620, a handover performing unit 630, and a response information reception unit 640.

The network information generator 610 detects a handover according to the movement of a mobile terminal at the reception side, and generates a packet including network information. The network information transmitter 620 transmits the packet, via a transmission channel, to a transmission side.

Upon receipt of the packet including the network information transmitted from the reception side, the transmission side transmits a packet including information in response to the received packet. The response information reception unit 640 analyzes the packet to determine whether to perform a handover. If the reception side should perform the handover, the handover performing unit 630 of the QoS securing apparatus 600 at the reception side performs the handover.

Figure 7:
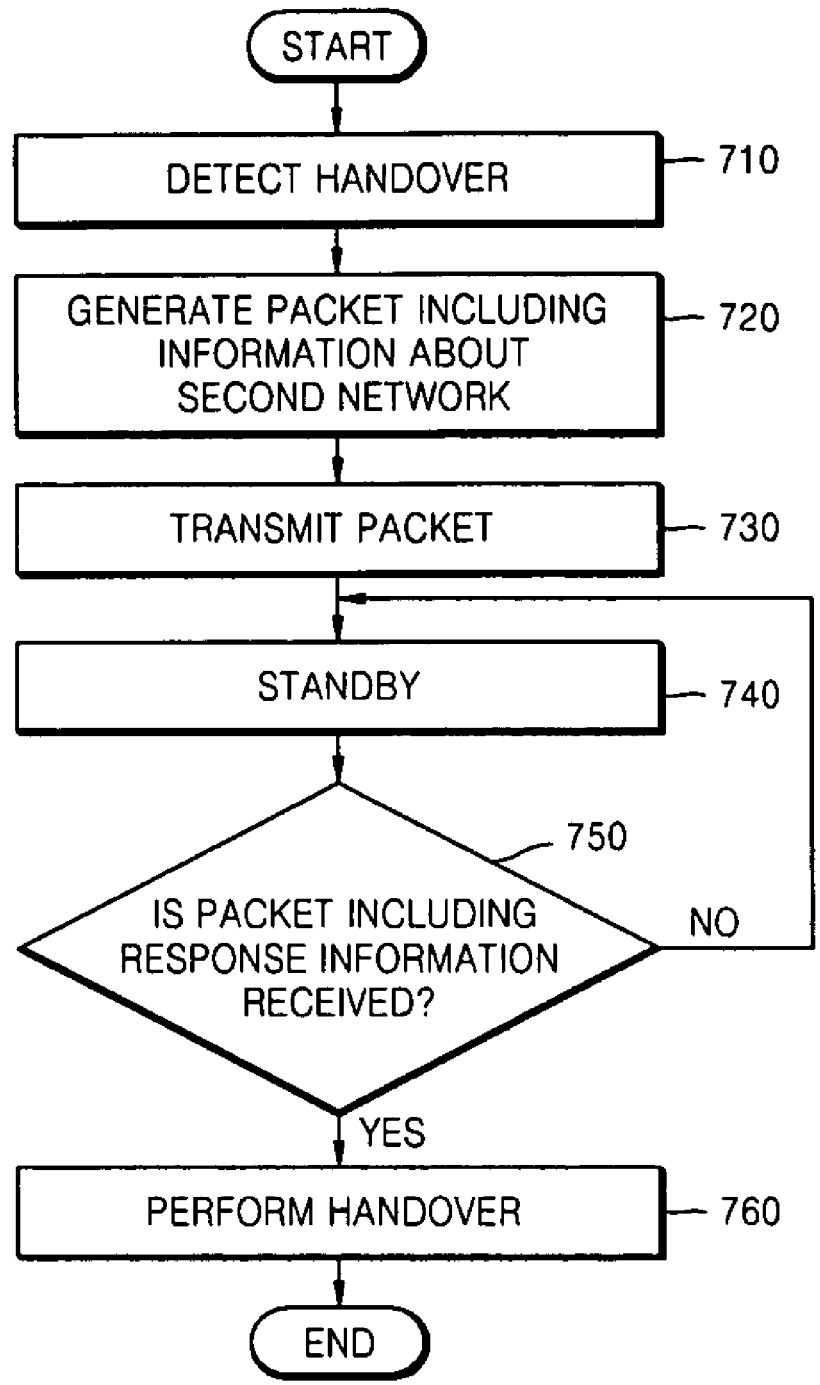
FIG. 7 is a flowchart of a QoS securing method performed by a reception side according to an example embodiment of the present invention.

FIG. 7 is a flowchart of a QoS securing method performed at a reception side according to an example embodiment of the present invention. Referring to FIG. 7, the reception side detects a handover according to a movement between heterogeneous or homogeneous networks (Operation 710).

The reception side that detects the handover generates a packet including information about a particular network, for example, a second network 4200 or 4201, as shown in FIGS. 4A-4B, to which the reception side moves to (Operation 720), and transmits the packet to a transmission side (Operation 730). The reception side waits for response information from the transmission side (Operation 740).

If the reception side analyzes a packet being transmitted while waiting for the response information, and receives the response information informing that the transmission side is completely prepared to transmit data according to the environment of the network, thus allowing the reception side to perform a handover (Operation 750), the reception side performs the handover (Operation 760). If the reception side fails to receive the response information from the transmission side, the reception side does not perform the handover and waits for the response information.

Figure 8:
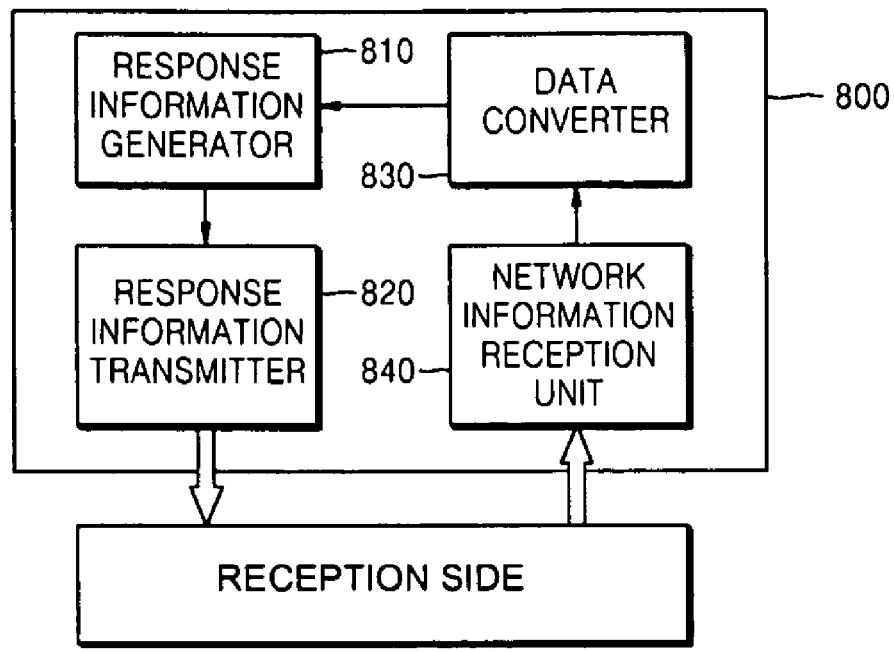
FIG. 8 is a block diagram of a QoS securing apparatus at a transmission side according to an example embodiment of the present invention.

FIG. 8 is a block diagram of an example QoS securing apparatus at a transmission side according to an example embodiment of the present invention. Referring to FIG. 8, the QoS securing apparatus 800 can be incorporated into or installed in an access router or a switch system at a transmission side, as shown, for example, in FIGS. 1A-1B. Such a QoS securing apparatus 800 comprises a response information generator 810, a response information transmitter 820, a data converter 830, and a network information reception unit 840. If a reception side transmits a packet including network information to the transmission side, the network information reception unit 840 analyzes the packet in order to acquire information about a particular network in which the reception side performs a handover.

Based on the information about the network, the data converter 830 prepares to transmit data according to the handover performed by the reception side. The data converter 830 compresses video image data or sound data or deteriorates video image quality or sound quality in order to transmit the data through a network having a slower data transmission rate than that of another network before the handover is performed. To the contrary, the data converter 830 improves video image quality or sound quality in order to transmit the data through a network having a faster data transmission rate than that of another network before the handover is performed.

In addition, the data converter 830 changes previously prepared video image data or sound data to data according to a data transmission rate of a changed network. If the data converter 830 is completely prepared to perform the handover, the response information generator 810 generates a packet including response information so that the reception side can perform the handover. The response information transmitter 820 transmits the packet including the response information to the reception side.

Figure 9:
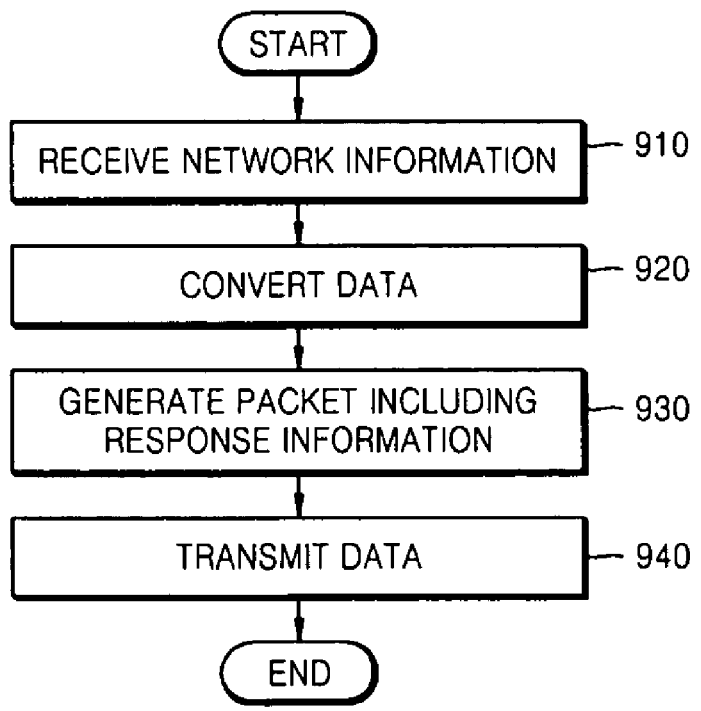
FIG. 9 is a flowchart of a QoS securing method performed by a transmission side according to an example embodiment of the present invention.

FIG. 9 is a flowchart of a QoS securing method performed at a transmission side according to an example embodiment of the present invention. Referring to FIG. 9, the transmission side receives a packet including network information transmitted from a reception side (Operation 910). The transmission side converts data according to a changed network based on the network information included in the received packet (Operation 920). The transmission side generates a packet including response information in order to perform a handover (Operation 930), and transmits the packet to the reception side (Operation 940).

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. The computer readable recording medium can also be distributed network coupled computer systems so that the computer readable code is stored and executed in a distributed fashion.

According to the present invention, when a reception performs a handover between heterogeneous or homogeneous networks, a transmission side can be obtain information about a network in which the reception side performs the handover via the exchange of packets between the reception side and the transmission side, thereby securing a QoS of real-time data transmission such as audio or video streaming.

Various components of the QoS securing apparatus at the reception side and at the transmission side, as shown, for example, in FIG. 6 and FIG. 8, can be implemented in software or hardware, such as, for example, an application specific integrated circuit (ASIC) or printed circuit board (PCB). As such, it is intended that the processes described herein be broadly interpreted as being equivalently performed by software, hardware, or a combination thereof. Software modules can be written, via a variety of software languages, including C, C++, Java, Visual Basic, and many others. The various software modules may also be integrated in a single application executed on various types of wireless cards. These software modules may include data and instructions which can also be stored on one or more machine-readable storage media, such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact discs (CDs) or digital video discs (DVDs). Instructions of the software routines or modules may also be loaded or transported into the wireless cards or any computing devices on the wireless network in one of many different ways. For example, code segments including instructions stored on floppy discs, CD or DVD media, a hard disk, or transported through a network interface card, modem, or other interface device may be loaded into the system and executed as corresponding software routines or modules. In the loading or transport process, data signals that are embodied as carrier waves (transmitted over telephone lines, network lines, wireless links, cables, and the like) may communicate the code segments, including instructions, to the network node or element. Such carrier waves may be in the form of electrical, optical, acoustical, electromagnetic, or other types of signals.

While there have been illustrated and described what are considered to be example embodiments of the present invention, it will be understood by those skilled in the art and as technology develops that various changes and modifications, may be made, and equivalents may be substituted for elements thereof without departing from the true scope of the present invention. Many modifications, permutations, additions and sub-combinations may be made to adapt the teachings of the present invention to a particular situation without departing from the scope thereof. For example, the components of the QoS securing apparatus, as shown in FIG. 6 and FIG. 8, can be implemented in a single hardware or firmware stalled at an existing card to perform the functions as described. In addition, the wireless networks have been described in the context of a wireless LAN or a CDMA/WCDMA network, it should be appreciated that the present invention is not limited to this particular wireless network or protocol. Rather, the invention is applicable to other wireless networks and compatible communication protocols. The present invention is also applicable for use with all types of wireless communication devices and wireless networks, including, for example, wireless personal area networks (PANs), Wi-Fi networks, Bluetooth, ultra-wideband networks, and wireless metropolitan area networks (MANs) and compatible wireless application protocols usable for wireless transmission as specified by IEEE 802.11(a), (b) and/or (g) standards, Bluetooth standards, Wi-Max, or even mobile cellular networks supporting a wide range of coverage (e.g., based on Telecommunications Industry Association (TIA)/Electronics Industries Alliances (EIA) standards, such as IS-95, IS-856 or IS-2000), such as a Time Division Multiple Access (TDMA) network, a Global System for Mobile communication (GSM) network, a General Packet Radio Service (GPRS) network, or a Universal Mobile Telecommunications System (UMTS) network, and the next generation of wireless networks which may become available as technology develops for wireless data services and applications, such as wireless email, web, digital picture taking/sending and assisted-GPS position location applications, and compatible network protocols, such as hyper text transfer protocols (HTTP), file transfer protocols (FTP), VoIP protocols, and UMTS protocols as defined by 3GPP group (see http://www.3gpp.org). Furthermore, alternative embodiments of the invention can be implemented as a computer program product for use with a computer system. Such a computer program product can be, for example, a series of computer instructions stored on a tangible data recording medium, such as a diskette, CD-ROM, ROM, or fixed disk, or embodied in a computer data signal, the signal being transmitted over a tangible medium or a wireless medium, for example microwave or infrared. The series of computer instructions can constitute all or part of the functionality described above, and can also be stored in any memory device, volatile or non-volatile, such as semiconductor, magnetic, optical or other memory device. Accordingly, it is intended, therefore, that the present invention not be limited to the various example embodiments disclosed, but that the present invention includes all embodiments falling within the scope of the appended claims.

What is claimed is:

1. A method of securing a quality of service (QoS) of data being received by a mobile terminal at a data reception side that performs a handover from a first network to a second network, the method comprising:

generating, at the mobile terminal at the data reception side, a first packet including information about the second network;

transmitting the first packet from the mobile terminal at the data reception side to a data transmission side; and selectively performing the handover, at the mobile terminal at the data reception side, based on response information included in a second packet received from the data transmission side in response to the first packet, wherein the information about the second network includes information about a data transmission rate of the second network, wherein the first packet including the information about the second network is a real-time transport control protocol (RTCP) packet.

2. The method of claim 1, wherein the generating of the first packet comprises: inserting information about the second network into a feedback control information field of an immediate feedback mode RTCP packet.

3. A computer readable non-transitory recording medium storing a computer readable program for executing a method of claim 1.

4. The method of claim 1, wherein the information about the second network further includes at least one of signal to noise ration, information indicating interruption of a radio wave and bit error rate.

5. The method of claim 1, wherein the information about the second network is used, by a device that is transmitting data to the mobile terminal, for converting the data to be transmitted.

6. An apparatus for securing a QoS of data being received by a mobile terminal at a data reception side that performs a handover from a first network to a second network, the apparatus comprising:

a network information generator arranged to generate a first packet including information about the second network at the mobile terminal at the data reception side;

a network information transmitter arranged to transmit the first packet from the mobile terminal at the data reception side to a data transmission side; and a handover performing unit to selectively perform the handover at the mobile terminal at the data reception side, based on response information included in a second packet received from the data transmission side in response to the first packet, wherein the information about the second network includes information about a data transmission rate of the second network, wherein the first packet including the information about the second network is an RTCP packet.

7. The apparatus of claim 6, wherein the information about the second network is inserted in a feedback control information field of an immediate feedback mode RTCP packet.

8. A method of securing a QoS of data performed by a device that is transmitting data to a mobile terminal that performs a handover from a first network to a second network, the method comprising:

receiving a first packet including information about the second network from the mobile terminal;

converting data to be transmitted to the mobile terminal according to the information about the second network included in the first packet;

generating a second packet including response information informing that the data transmission is prepared based on the information about the second network; and transmitting the second packet to the mobile terminal, wherein the information about the second network includes information about a data transmission rate of the second network, and wherein the first packet including the information about the second network is an RTCP packet.

9. The method of claim 8, wherein the converting of the data comprises converting the rate of compression or the size of the data to be transmitted to the mobile terminal.

10. The method of claim 8, wherein the second packet is a real-time transport protocol (RTP) packet.

11. The method of claim 10, wherein the generating of the second packet comprises: setting a marker bit of the RTP packet to "1".

12. The method of claim 11, wherein the RTP packets in which the marker bit is set to "1" are plural.

13. The method of claim 8, wherein the response information includes information about a data transmission rate of the second network.

14. The method of claim 13, wherein the second packet is a RTCP packet.

15. The method of claim 14, wherein the generating of the second packet comprises: inserting information about the second network into a feedback control information field of an immediate feedback mode RTCP packet.

16. A computer readable non-transitory recording medium storing a computer readable program for executing a method of claim 8.

17. The method of claim 8, wherein the information about the second network includes information about a data transmission rate of the second network.

18. An apparatus for securing a QoS of data using a device that is transmitting data to a mobile terminal that performs a handover from a first network to a second network, the apparatus comprising:

a network information data reception unit arranged to receive a first packet including information about the second network from the mobile terminal;

a data converter arranged to convert data to be transmitted to the mobile terminal according to the information about the second network included in the first packet;

a response information generator arranged to generate a second packet, which is a RTP packet, including response information informing that the data transmission is prepared based on the information about the second network; and a response information transmitter arranged to transmit the second packet to the mobile terminal, wherein the information about the second network includes information about a data transmission rate of the second network, and wherein the first packet including the information about the second network is an RTCP packet.

19. The apparatus of claim 18, further comprising: wherein the second packet is a RTP packet.

20. The apparatus of claim 18, wherein the response information generator sets a marker bit of the second packet to "1" to generate the second packet.

21. The apparatus of claim 18, wherein the response information generator generates the second packet including the response information.

22. A method of securing a quality of service (QoS) when a mobile terminal moves between service areas provided two wireless communication networks having a switch system and different data transmission rates, comprising:

detecting, at the mobile terminal, a handover from the first network to the second network, when the mobile terminal moves from a service area provided by a first network to a service area provided by a second network;

generating, at the mobile terminal, a first packet including information about the second network;

transmitting, at the mobile terminal, the first packet including information about the second network to the switch system; and selectively performing, at the mobile terminal at the data reception side, the handover from the first network to the second network based on the response information included in a second packet received from the switch system in response to the first packet, wherein the information about the second network includes information about a data transmission rate of the second network, wherein the first packet including the information about the second network is an RTCP packet.

23. The method of claim 22, wherein the first packet includes information about the second network inserted into a feedback control information field of an immediate feedback mode RTCP packet.

24. The method of claim 22, wherein, upon receipt of the first packet including information about the second network, the switch system converts data to be transmitted to the mobile terminal according to the second network based on the information included in the first packet, generates the second packet including response information informing that data conversion is prepared based on the information about the second network, and transmits the second packet to the mobile terminal.

* * * * *

UNITED STATES PATENT AND TRADEMARK OFFICE
CERTIFICATE OF CORRECTION

PATENT NO.          : 8,379,595 B2                                        Page 1 of 1
APPLICATION NO.     : 11/600052
DATED               : February 19, 2013
INVENTOR(S)         : Choe It is certified that error appears in the above-identified patent and that said Letters Patent is hereby corrected as shown below:

In the Claims

Column 13, Line 26, in Claim 4, delete "ration," and insert -- ratio, --, therefor.
Column 13, Line 43, in Claim 6, delete "side," and insert -- side --, therefor.

Signed and Sealed this
Twenty-ninth Day of July, 2014

Michelle K. Lee
*Deputy Director of the United States Patent and Trademark Office*